United States Patent

[11] 3,600,879

| [72] | Inventor | Fred Coffman |
| | | 820 Fox Hill Drive, Ruskin, Fla. 33570 |
| [21] | Appl. No. | 868,842 |
| [22] | Filed | Oct. 23, 1969 |
| [45] | Patented | Aug. 24, 1971 |

[54] LAWNMOWER ATTACHMENT
10 Claims, 5 Drawing Figs.

[52] U.S. Cl. .................................................. 56/249, 56/26
[51] Int. Cl. ...................................................... A01d 55/20
[50] Field of Search........................................ 56/249, 294, 255, 25.4, 26

[56] References Cited
UNITED STATES PATENTS

| 1,918,357 | 7/1933 | Wagner | 56/249 |
| 2,023,697 | 12/1935 | Reynolds | 56/294 |
| 2,794,309 | 6/1957 | Tabac | 56/249 |
| 3,101,580 | 8/1963 | Schesser | 56/25.4 |

*Primary Examiner*—Russell R. Kinsey
*Attorney*—Jacobi, Lilling & Siegel

ABSTRACT: There is disclosed a racking or combing attachment for a lawnmower having a frame member above and ahead of the mower's cutting means and which attachment includes a transversely extending crossbar means, a plurality of teeth secured to such crossbar means to extend therefrom in a common plane and means securing the crossbar means to the frame member in such fashion that the common plane containing the teeth is disposed in advance of the cutting means and at a downward and rearward angle that intersects the ground in advance of the cutting means. As a specific aspect, the teeth have heads thereon that facilitate the raising of grass and disruption of matted grass formations.

INVENTORS
FRED COFFMAN

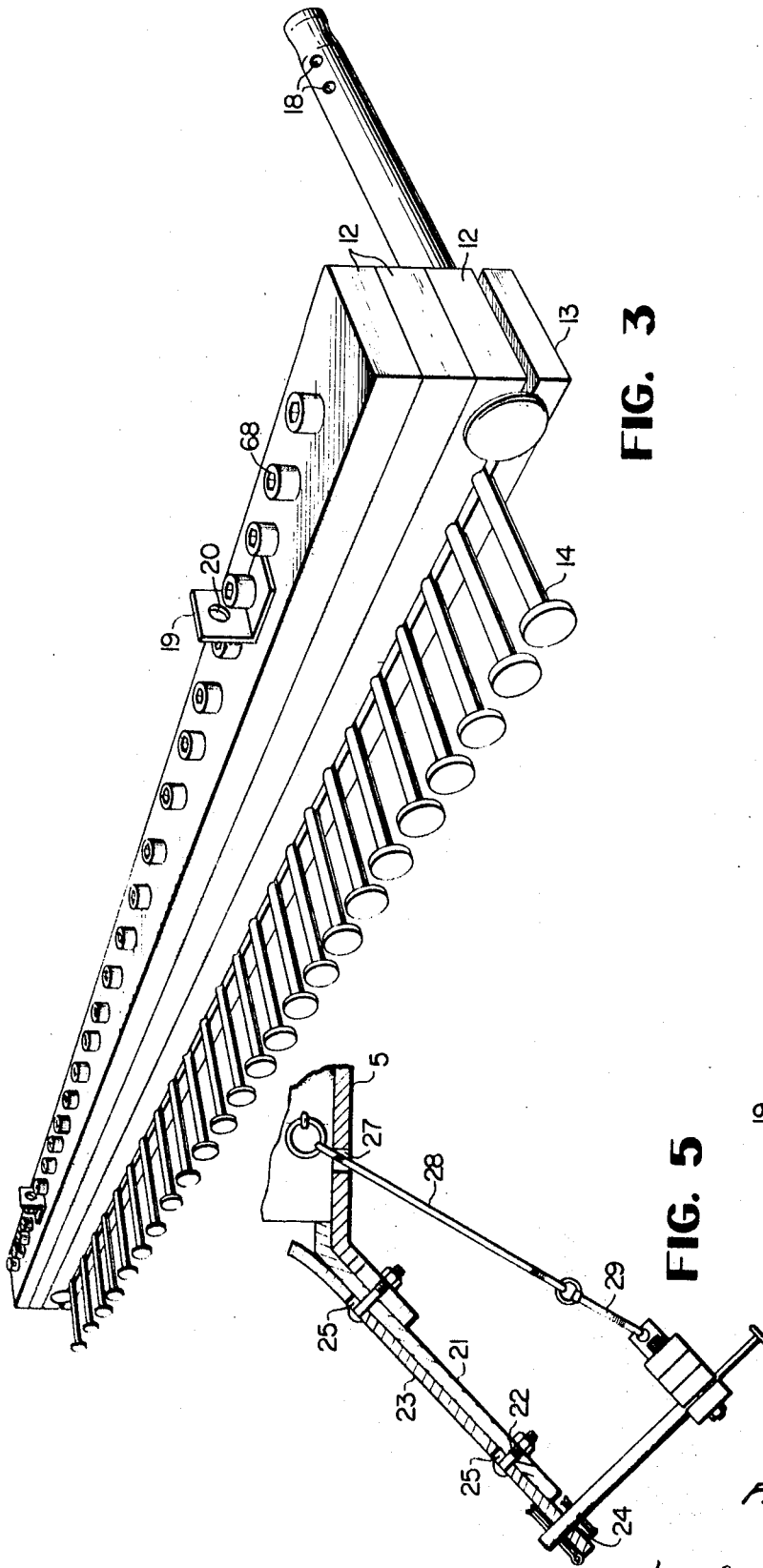
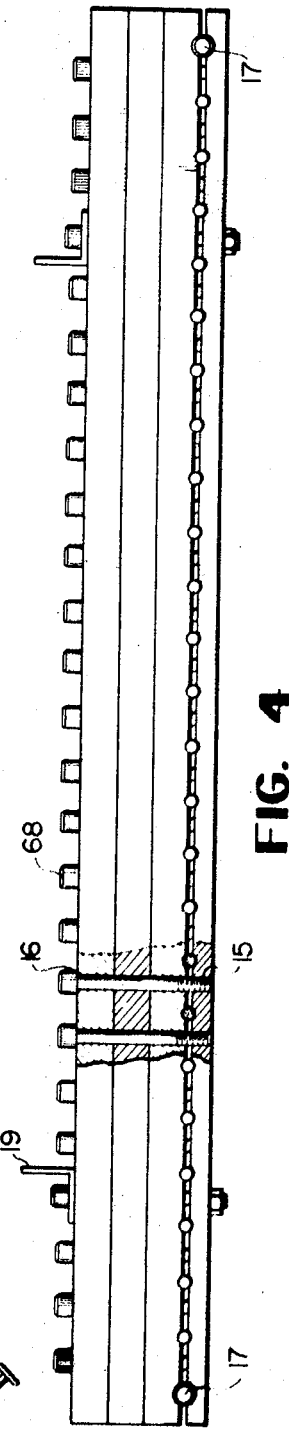

LAWNMOWER ATTACHMENT

BACKGROUND OF THE INVENTION

The present invention relates broadly to the art of mowing of grass and the like.

More particularly, this invention relates to a lawnmower attachment.

Still more particularly this invention relates to a lawnmower attachment in the form of a grass-lifting rake or comb disposed in advance of the mower cutting mechanism.

The prior art is replete with lawnmower rake-type attachments which are intended to lift grass, weeds, crab grass or the like to dispose the blades thereof vertically to assure their being properly severed by the cutting mechanism of the mower.

However, such attachments generally include vertically directed or forwardly directed teeth. With such a toothed arrangement, the grass can pack or clog the attachment and in instances where the rake teeth are pointed, there is the danger that they will dig into the ground.

SUMMARY OF THE INVENTION

It is therefore a primary object of the present invention to provide a lawnmower attachment which overcomes the above noted disadvantages of the prior art and which overcomes the above noted disadvantages of the prior art and which will be effective to raise grass and the like in advance of the mower cutting mechanism, so as to ensure proper cutting thereof.

It is another object of this invention to provide a lawnmower attachment that is effective in raising the matted grass formation resulting from planting of Bermuda grass and which obtains effective lawn cutting rather than a scalping or a pressing down of the already matted formation.

A further object of this invention is to provide a lawnmower attachment in the form of a rake or comb means carried by the mower frame and including a plurality of transversely aligned raking elements or teeth located in advance of the mower cutting mechanism but directed to extend downwardly and rearwardly toward the cutting plane.

A still further object of the invention is to provide a lawnmower attachment in which the aforementioned downwardly and rearwardly directed grass-lifting teeth are provided with heads at the free ends which lie in a plane that extends perpendicular to the plane containing the transversely aligned teeth and which heads facilitate the lifting or raising of matted grass formations.

It is a still more specific object of this invention to provide a lawnmower attachment which includes crossbar means constituting a tooth or tine holder, a plurality of raking teeth or tines carried by such crossbar means and projecting from one side thereof in transversely aligned relation, support bar means carried by said crossbar means adjacent the opposite ends thereof and projecting outwardly of the side of the crossbar means opposite to the raking teeth, transversely spaced support arms carried by a lawnmower frame or platform component and extending generally downwardly and forwardly thereof and connecting strip means removably connected to the respective support bar means and adjustably and removably connected to the support arms for adjustably and removably connecting the crossbar means to the lawnmower.

It is an additional specific object of this invention to constitute such crossbar means as a plurality of equilength bars, including at least two bars, each provided with a row of matching transversely extending half-grooves in facing relation to constitute teeth receiving apertures, at each end of such row of matching half-grooves, larger half-grooves to constitute support bar receiving apertures, a row of internally threaded bores through the lowermost bar, transversely of and alternating with the half-grooves therein, bores through the other bars in alignment with such threaded bores and headed, threaded bolt means for disposition in and engagement with such threaded bores to clamp the crossbars together to hold the teeth in their associated grooves.

BRIEF DESCRIPTION OF THE DRAWINGS

Further and more specific advantages and objects of the invention will become apparent from the following description taken in connection with the accompanying drawings in which:

FIG. 3 is a perspective view illustrating the major components of the raking or combing attachment of the invention;

FIG. 4 is a front view of the crossbar means of the attachment; and

FIG. 5 is a fragmentary view, partly in section and partly in elevation, illustrating the connection of the attachment to the mower.

The invention will be described in connection with a power mower of the rotating reel-type cutting means. Further as to certain dimensions and size relationships set forth hereinafter, it is to be understood that some will vary in accordance with the size of the mower.

Figure 1:
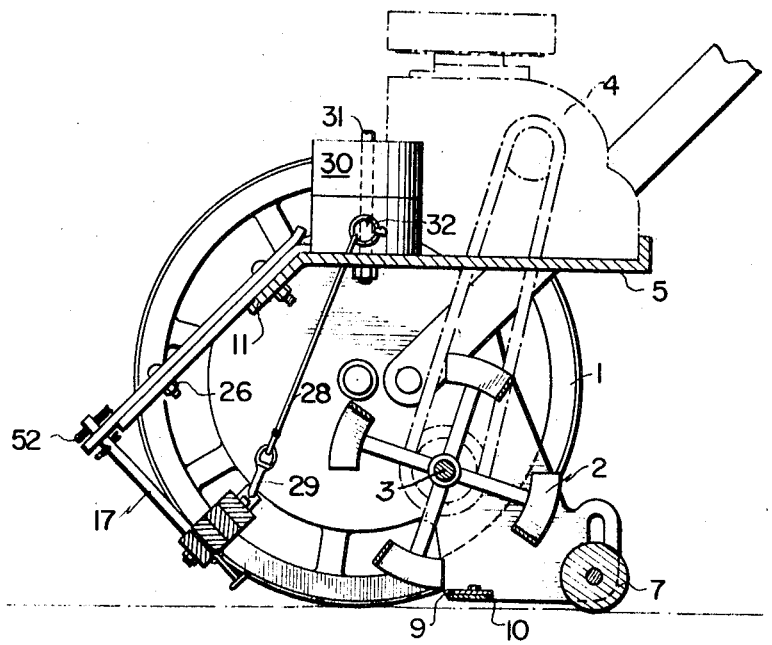
FIG. 1 is a view partly in side elevation and partly in section and illustrating a lawnmower equipped with the attachment of this invention.
Figure 2:
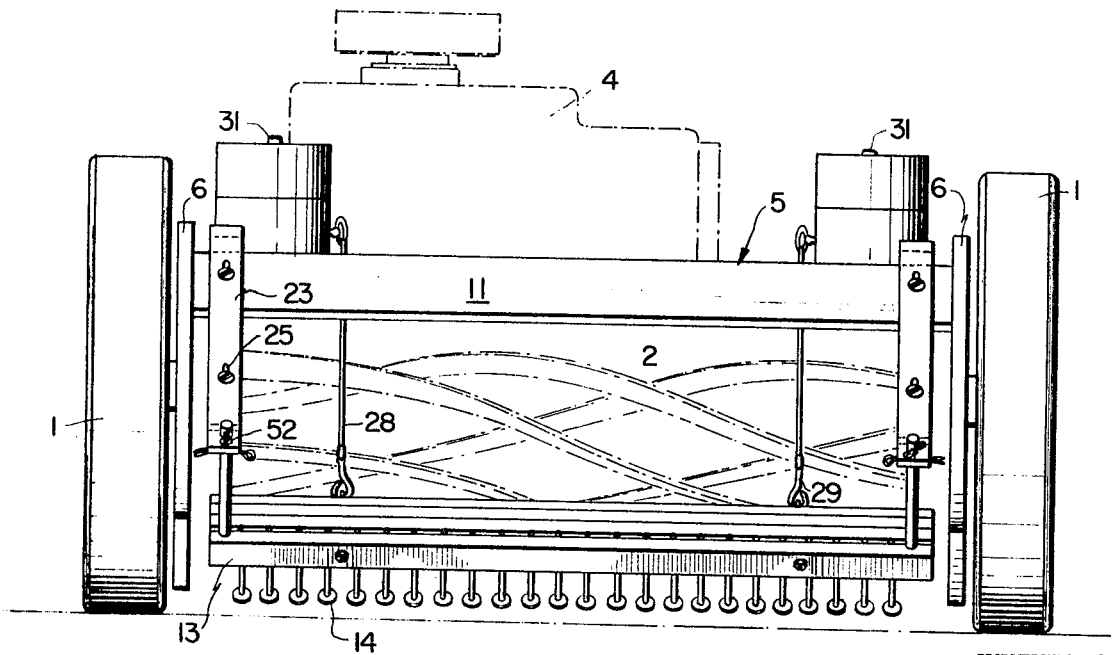
FIG. 2 is a front view of the arrangement shown in FIG. 1.

Accordingly, FIGS. 1 and 2 illustrate the attachment as embodied with a reel-type power mower of a size to cut an 18 inch swath.

The mower, which is of a conventional nature, includes main wheels 1, a rotary cutting reel 2, mounted on a shaft 3, driven by a conventional chain drive from a power unit 4 mounted on a top frame or platform 5 that extends between and rigidly connects the side frames 6 that support the wheels. A rear roller 7 is adjustably mounted at the rear of side frames or plates 6 and a stationary blade 9 is adjustably carried by a cross bar 10 also extending between the side frames or plates 6.

The platform 5 includes a depending front flange or lip 11. The attachment of the invention includes certain major components, namely crossbar means, teeth elements, clamping means, support bar means and attaching means.

Thus the crossbar means in the illustrated arrangement includes four mild steel bars, the upper three bars 12 are 20 inches long by one inch wide by one-half inch thick. The lower bar 13 has the same length and width but is of one-quarter inch thickness. The upper surface of the lower bar and under surface of the upper bar are drilled or grooved to provide a row of parallel tooth receiving apertures extending transversely of the length of such bars. These apertures are spaced longitudinally of the bars approximately three-quarter inch between their centers so that 24 teeth or tines 14 can be accommodated therein. The teeth are constituted by 10-penny nails having their points ground off so that they are in effect headed pins. The grooves or partial apertures are formed by clamping the two lower bars together and drilling out a hole that is slightly less than the diameter of the nails so as to allow for the subsequently applied clamping action. Threaded holes 15 of one-quarter inch diameter are drilled through the bar 13 transversely of the grooves therein and between each groove. The other bars 12 are drilled with correspondingly dimensioned and aligned bores 16. At each end of the row of teeth receiving apertures, the lower bar 13 and adjacent bar 12, are drilled transversely to accommodate four inches long by three-eighth inch diameter headed support bars or pins 17. The holes to accommodate the pins 17 are drilled one-eighth inch larger than the pin diameters so that these pins can receive slight frictional clamping action when the device is moved forwardly but are substantially free to slide longitudinally through these holes so that the bars 12, 13 can move upwardly upon rearward movement of the device, and hence do not dig teeth 14 into the ground. However, it is to be understood that the main clamping action is to be exerted on the teeth elements 14.

As a result of the sliding fit of bars 12 and 13 upon pins 17, it will be apparent that upon forward movement of the mower, bars 12 and 13 with teeth 14 secured thereto will slide downwardly and rearwardly upon pins 17 and hence the teeth 14 will be presented in close proximity to the ground for maximum combing or raking action upon the grass. Upon rearward movement of the mower, however, the forward drag of the ground and/or grass upon bars 12 and 13 and teeth 14 will cause the bars and teeth to slide forwardly and upwardly upon pins 17 to raise the teeth out of raking engagement with the grass, thereby avoiding the possibility of digging teeth 14 into the ground upon such rearward movement.

Spaced cotter-pin receiving apertures 18 are formed at the free ends of each bar 17 to facilitate connection of the crossbar means to the mower frame. To clamp the crossbar means together and hold the headed pins in a common plane, there are provided 25 Allen head threaded bolts 68 that are associated through the aligned bores 16 and threaded into the threaded holes 15. Inwardly of each end of the top crossbar 12 and angled bracket 19 having an aperture 20 in one flange thereof is associated beneath the heads of two of the bolts 68 which are longer than the others, pass through their associated threaded holes 15 and receive nuts so as to provide a strong load-bearing connection of the brackets 19 for the purpose set forth hereinafter.

To mount the attachment to the mower, a pair of metal strip members 21 having bolt accommodating apertures 22, are fastened to the top and depending lip 11 of the platform or frame top 5. Another pair of metal strip members 23 are connected to the strip member 21. These strip members 23 are provided with a lower aperture 24 for receiving the support bars or pins 17 and two axially spaced slots 25. The bars 17 are passed through the apertures 24 and cotter pins 52 fasten the bars 17 and the associated crossbar means to the strips 23. Bolt and nut means 26 are associated with the slots 25 and apertures 22 so as to adjustably connect the strips 21 and the crossbar means to the mower frame.

The platform 5 is provided with holes 27 through which pass connectors in the form of ropes or cables 28. The lower ends of these ropes are each provided with a suitable snap hook 29 that are secured in the apertures 20 of the brackets 19. Lead weight means 30 are mounted on elongated clamping bolts 31 that also pass through the metal strips 21. These weights, of approximately five pounds each, are for the purpose of applying an additional load adjacent each wheel thereby increasing the traction effect on the wheels of the mower. A ring 32 is secured to the lowermost weight and the upper end of each rope or cable 28 provide another suspension connection between the mower frame and the raking or combing attachment.

Therefore, it is apparent that the raking or combing attachment is adjustably connected to the mower frame, the crossbar means hold the headed teeth in a common plane inclined downwardly and rearwardly toward the cutting plane. The heads on the teeth in passing through the grass in advance of the cutting means, facilitates the lifting up of such grass and disrupts the matted condition of Bermuda grass growths so as to, in effect, fluff up such growth to ensure an improved cutting action.

Normal mowing operations usually involve both forward and rearward movement of the mower, regardless of the particular type of mower used. It will be appreciated that by virtue of the free sliding fit between bars 12 and 13 and bars 17, rearward movement of the mover will result in the horizontal bars 12 and 13, as well as the teeth 14 secured thereto, sliding forwardly and upwardly upon bars 17 to pass over the grass, and hence will avoid the possibility of digging teeth 14 into the ground upon such rearward movement.

As indicated previously, the size of the crossbar means can vary in accordance with the width of the mower frame. Thus, for a larger size mower, the crossbar means will be longer and more raking or combing teeth will be associated therewith.

Further, the invention is not to be limited to the particular mounting structure that adjustably connects the toothed crossbar means to the frame so long as structural means are provided to permit vertical adjustment of the height of the teeth relative to the ground and the height of the cutting plane.

In addition, the invention is not to be limited to association with a reel-type cutting means, since a pair of forwardly extending and downwardly inclined support arms or strips could be mounted to the top frame or housing of a rotary mower to extend forwardly thereof and have the support bars 17 secured within apertures at the lower ends of such arms.

It is therefore clear that this invention provides a raking or combing attachment for a lawnmower that includes crossbar means, a plurality of equilength teeth having heads on the free ends thereof, means securing such teeth to such crossbar means to lie in a common plane transverse to the cutting direction and means connecting such crossbar means to the lawnmower in advance of the cutting means to dispose the common plane of the raking teeth at an angle that extends downwardly and rearwardly so as to intersect the cutting plane at an acute angle with the heads on such teeth lying in a common plane at an angle that extends downwardly and forwardly of a vertical plane, passing through the cutting plane.

It should be apparent from the foregoing detailed description, that the objects set forth at the outset to the specification have been successfully achieved.

WHAT IS CLAIMED IS:

1. A raking or combing attachment for a lawnmower having a frame member above and ahead of the mower's cutting means, comprising crossbar means extending transversely of the cutting direction, a plurality of teeth, means securing such teeth to said crossbar means to extend therefrom in a common plane, and means securing the crossbar means to the frame member in advance of the cutting means to dispose such common plane at a downward and rearwardly directed angle that intersects the ground in advance of the cutting means.

2. A raking or combing attachment for a lawnmower as claimed in claim 1 and said teeth having heads thereon that facilitate the raising of grass and the disrupting of matted grass formations.

3. A raking or combing attachment for a lawnmower as claimed in claim 1 and the means for securing the crossbar means to the frame member including components permitting vertical height adjustment of the crossbar means and thus the teeth relative to the mower.

4. A raking or combing attachment for a lawnmower as claimed in claim 1, in which said crossbar means comprise at least two bars, the respective facing surfaces of such bars each having a row of grooves therein, said teeth being accommodated in the apertures defined by said grooves, and the means securing said teeth to said crossbar means comprising means for clamping said bars together with said teeth in said apertures.

5. A raking or combing attachment for a lawnmower as claimed in claim 1 and the means securing said crossbar means to said frame member comprising support bars extending outwardly of the crossbar means from the side thereof opposite said teeth and adjacent each end of said crossbar means, a strip member for each support, means for connecting the support bars to their associated strip members, and means for vertically adjustably connecting each strip member to said frame member.

6. A lawnmower including a frame member, a cutting means and a raking attachment comprising a plurality of transversely aligned teeth supported from said frame member ahead of said cutting means and lying in a common plane that extends downwardly and rearwardly and intersects the cutting plane at an acute angle thereto.

7. A lawnmower as claimed in claim 6 and means for adjusting the height of said teeth relative to the ground.

8. A lawnmower as claimed in claim 7 and heads on said teeth lying in a common plane that extends downwardly and forwardly of the vertical plane passing through the cutting location.

9. A lawnmower as claimed in claim 7 in which said raking attachment includes crossbar means constituting a tooth holder, means for clamping said teeth to said crossbar means to project outwardly of one side thereof, support bar means carried by said crossbar means and projecting outwardly of the side of said crossbar means opposite said teeth, transversely spaced support arms carried by said lawnmower frame member and extending generally downwardly and forwardly thereof, and connecting strip means removably connected to said support bar means and adjustably and removably connected to said support arms.

10. A lawnmower as claimed in claim 9 and additional support means extending between said crossbar means and said lawnmower frame member.